United States Patent [19]
Sidler et al.

[11] Patent Number: 5,992,612
[45] Date of Patent: Nov. 30, 1999

[54] APPARATUS FOR FEEDING ARTICLES INTO A LEHR

[75] Inventors: Werner Sidler, Esslingen; Karl Rimmele, Schmerikon, both of Switzerland

[73] Assignee: Inmara AG, Pfaeffikon, Switzerland

[21] Appl. No.: 08/783,742

[22] Filed: Jan. 16, 1997

[51] Int. Cl.⁶ .................................................. B65G 47/02
[52] U.S. Cl. ............................................................ 198/430
[58] Field of Search .................................. 198/429, 430, 198/468.1, 468.11, 597, 598

[56] References Cited

U.S. PATENT DOCUMENTS 5,092,449  3/1992  Bolin ........................................ 198/430
5,472,077  12/1995  Bolin ........................................ 198/430

FOREIGN PATENT DOCUMENTS 2174667  11/1986  United Kingdom ................... 198/430

Primary Examiner—James R. Bidwell
Attorney, Agent, or Firm—Karl Hormann

[57] ABSTRACT

An apparatus for intermittently feeding glass containers continuously approaching in a first plane in a first direction into an annealing lehr in a second direction in the first plane by a feed bar mounted for reciprocal movement in the second direction on a carriage suspended by support struts slidably connected to parallel guide rails disposed in a plane substantially normal to the first plane.

15 Claims, 3 Drawing Sheets

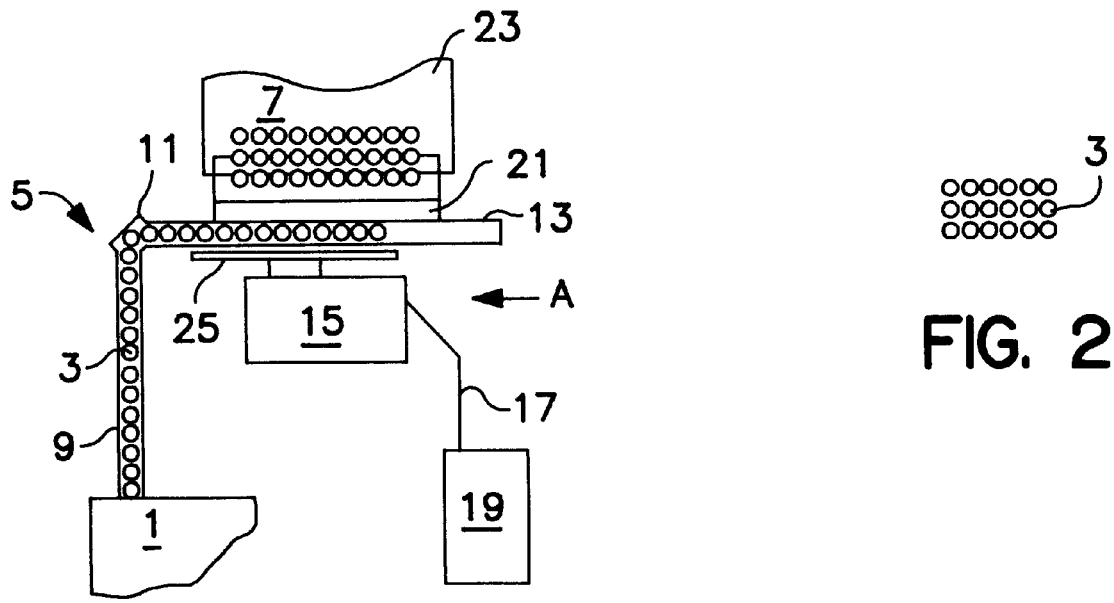
FIG. I
FIG. 2
FIG. 3
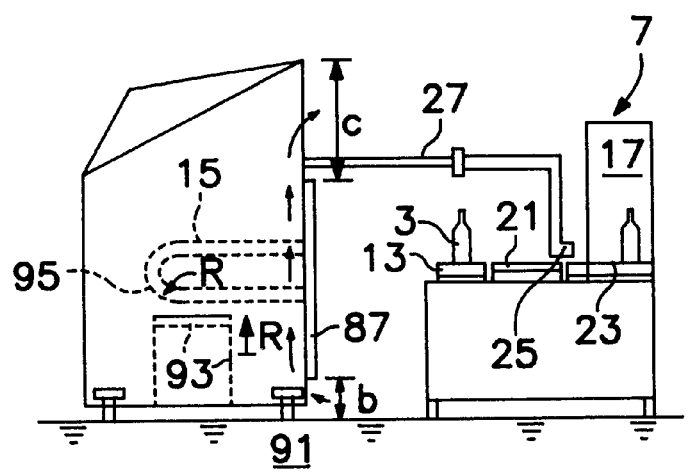
FIG. 4

APPARATUS FOR FEEDING ARTICLES INTO A LEHR

BACKGROUND OF THE INVENTION

1. Field of the Invention

The invention, in general, relates to a novel apparatus for feeding articles into a lehr. More particularly, the invention relates to a novel apparatus for feeding continuously conveyed hot glass containers into a lehr. Preferably, the apparatus is provided with a feed bar arranged in parallel relationship to glass containers moved in an erect disposition on a first conveyor, a cantilever for supporting the feed bar, a carriage movable in a first transport direction for guiding the cantilever, drive means for moving the carriage in the first transport direction, drive means for moving the feed bar in a second direction normal to the first transport direction, drive means for moving the feed bar in a third transport direction vertically of the plane defined by the first and second transport directions, and a support including guide rails for guiding the carriage.

2. The Prior Art

Following their manufacture, it is necessary gradually to cool down and to anneal glass containers in a lehr. The lehr is loaded by a loader, i.e. a movably mounted feed bar which is preferably provided with receptacles corresponding to the shapes of the various glass containers. The feed bar serves to feed a plurality of glass containers which are continuously moved by a conveyor belt, in a direction laterally of the conveyor belt into the lehr.

Such devices for feeding hot glass containers into a lehr have been known for a long time. As a rule, they consist of a feed bar of the kind described, by a forward edge of which the hot containers are seized, a cantilever on which the feed bar is mounted, and a carriage movable parallel to the direction of movement of the conveyed containers, as well as a carriage which is arranged for movement normal to the direction of movement, i.e. in a direction into the lehr. Moreover, a linkage may be provided to allow upward pivoting of the cantilever so that upon its movement away from the lehr it may be moved over any glass containers which may have been forwarded by the conveyor belt in the meantime. In conventional apparatus, the carriage supporting the cantilever is movable in a housing in a direction normal to the direction of movement of the glass containers. On this carriage, there is provided a second carriage movable in a direction parallel to the conveyor belt and supporting the pivotal cantilever. For moving the carriage in a feed direction, there is provided a drive within the housing. Movement is imparted either hydraulically or by means of a cam drive.

Calibration of the known drives, i.e., their synchronization, in respect of the arriving glass containers is a matter of considerable difficulty and can only be accomplished when the apparatus is idle. This means, however, that operation of the apparatus must for this purpose be interrupted. This leads to high costs because of the interrupted operation or because of too low a utilization of the equipment. Moreover, hydraulic and/or mechanical cam drives require relatively frequent and involved maintenance.

OBJECTS OF THE INVENTION

It is thus an object of the present invention to provide an apparatus for precision feeding arriving glass containers into a lehr.

Another object of the invention is the provide for adjusting or calibrating and altering movements in all directions even during operation.

Still another object of the invention is to provide for a low maintenance apparatus requiring servicing at large intervals only.

BRIEF DESCRIPTION OF THE INVENTION

In the accomplishment of these and other objects, the invention provides for an apparatus of the kind referred to supra provided with a pair of first guide rails arranged in superposition and extending in a first feed direction at the front side of a support, a carriage which at its front is provided with downwardly extending support struts with guide shells at their ends for rolling along the first guide rails, second guide rails vertically mounted on the carriage relative to the first guide rails, and a pivotal carriage supported by the second guide rails for pivotally supporting the cantilever.

Surprisingly, it is possible by arranging the guide rails of the first transport means in parallel to the direction of the conveyed glass containers at the front of the frame to provide space below the carriage for the first drive which moves with the carriage, as well as for cables for energizing the drives. The space created by the L-shaped carriage makes it possible to position the cables such that no fatigue-related breaks of the cables can occur. A low-service drive for the longitudinal movement of the carriage can be provided by a toothed rack at the front of the support, and the unavoidable wear of the toothed rack as well as of the pinion of the drive is predictable, so that sudden break-downs common with the cogged belts of conventional apparatus can be avoided. The servomotors used as drives provide for absolutely reproducible and precise movements in individual directions, and it is possible, if necessary, to alter these movements after any movement. The L-shaped carriage may be manufactured in a highly warp-resistant manner, and because of the elasticities of the materials used substantially all deformations can be kept within tolerable limits. The wall of the housing mounted at the front of the support protects the interior of the apparatus from radiant heat, and by its distance from the bottom and/or ceiling of the housing provides for natural air circulation. Cooling of the servomotors is accomplished by movement induced air currents, for the servomotors are intermittently and with high velocity moved by their respective carriages. Hence, the apparatus requires no additional cooling. By upwardly pivotal lids of the housing the interior of the apparatus may for control purposes even be exposed during operation.

BRIEF DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and ad-vantages thereof, will be best understood from the following detailed description of preferred embodiments when read in connection with the appended drawings, in which:

FIG. 1 is a schematic representation, in top elevation, of an apparatus for manufacturing articles of glass in the vicinity of a lehr;

FIG. 2 depicts articles of glass arranged in series within the lehr;

FIG. 3 depicts articles of glass positioned in an offset or alternating pattern;

FIG. 4 represents a side view of the feed apparatus as seen in the direction of arrow A in FIG. 1;

DETAILED DESCRIPTION OF THE PREFERRED EMBODIMENT

Figure 5:
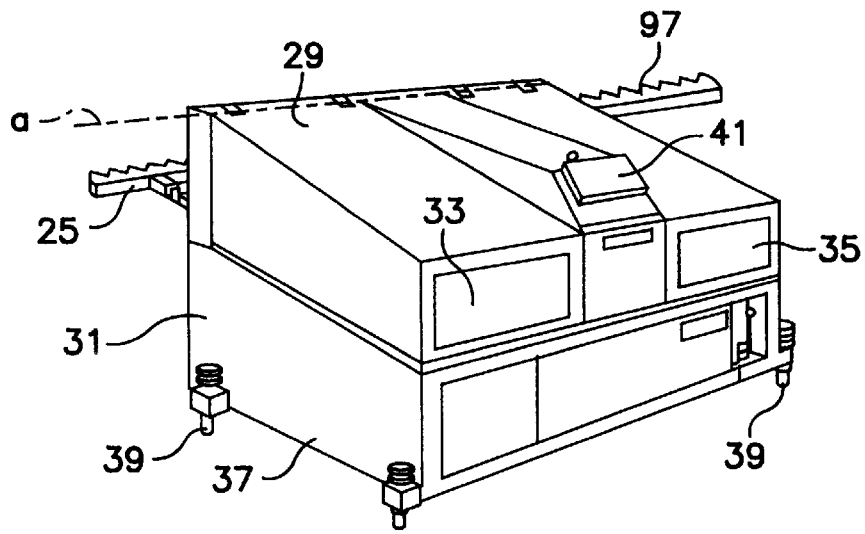
FIG. 5 is a perspective rear view of the apparatus.

From an apparatus, designated by reference numeral 1, for making articles of glass 3, such as, for instance, bottles 3, the latter are moved on a conveyor 5 to a lehr 7. On their path of initial movement, the articles of glass 3 are moved to a redirection apparatus 11 and thence, on a second conveyor 13 between the lehr 7 and a feeding device 15 positioned in front thereof. In the embodiment shown, the feeding device 15 is connected to a programmable control 19 by way of a line 17. The control 19 is preferably such as to allow changes in the operation, i.e., the extent of movement of the drives thereof, of the apparatus without interrupting its operation. Within the lehr 7 which is connected to the conveyor 13 by a bridge 21, the articles 3 of glass which may initially be at a temperature of about 600° C., may be placed upon a lehr conveyor 23 in serial (as shown in FIG. 2) or offset (as shown in FIG. 3) fashion to be slowly or gradually cooled down during their passage through the lehr.

In FIG. 4 a feed bar 25 may be seen which is mounted to the end of a pivotal and slidable cantilever 27. The cantilever 27 is supported by the feeding device 15.

Figure 6:
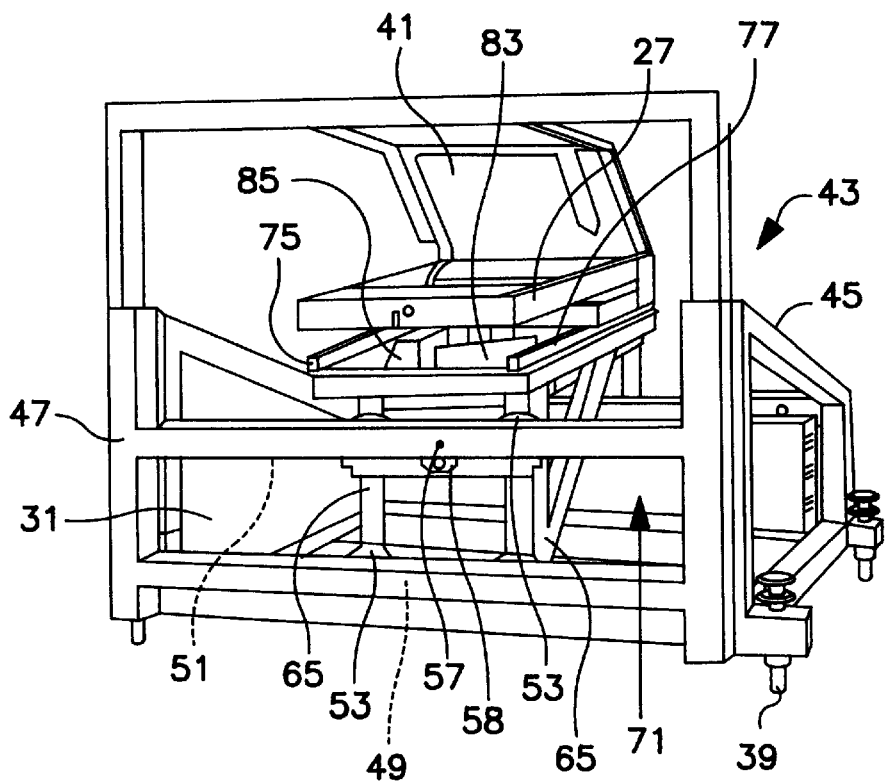
FIG. 6 is a perspective rear view of the support of the apparatus without the housing thereof.
Figure 7:
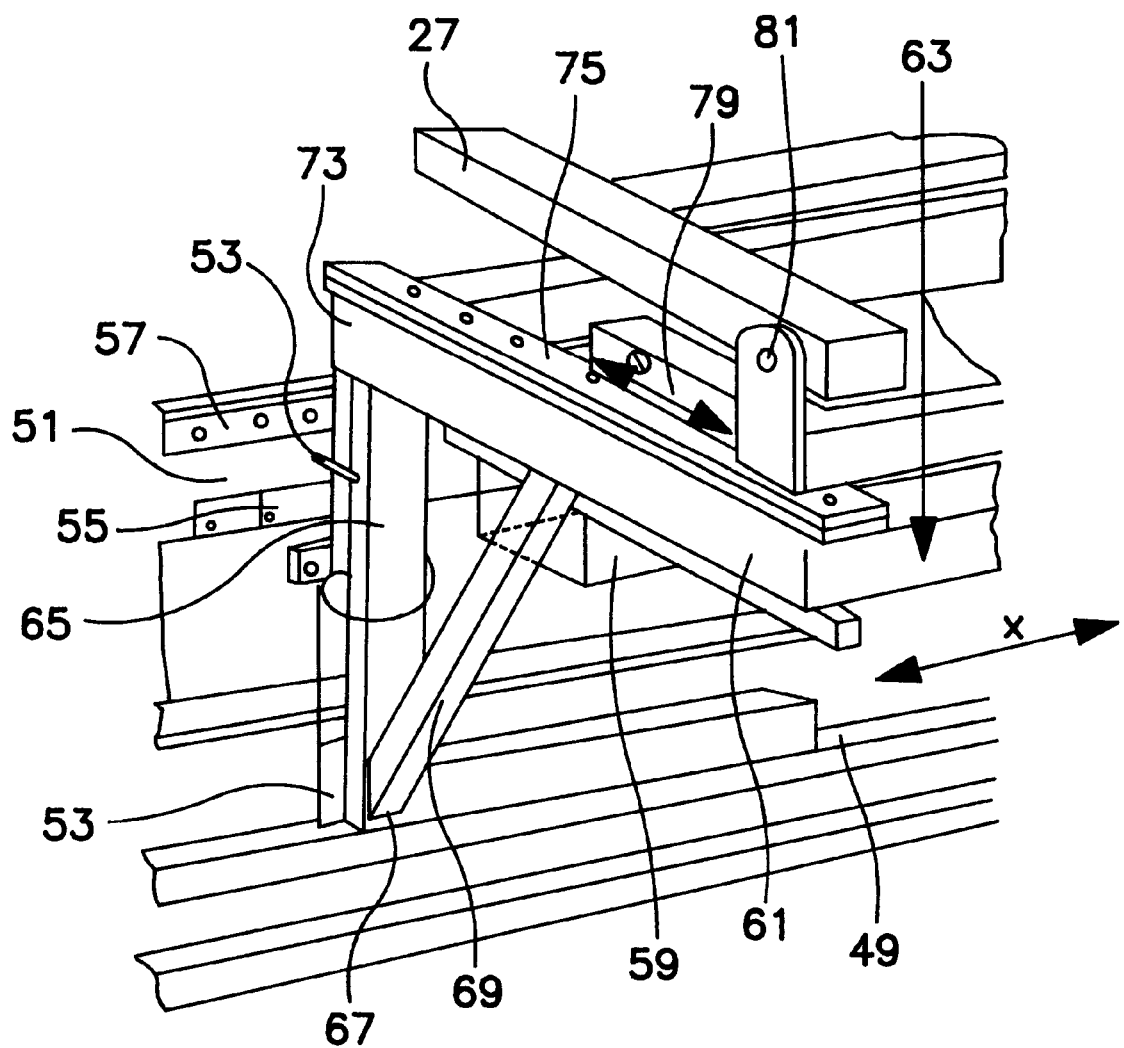
FIG. 7 is a perspective view, partially in section, of the carriage and front of the support.

The feeding device 15 is provided within a housing 29. The housing comprises two lids 33 and 35 mounted at a front surface 31 for pivotal movement about an axis a, a lower housing portion 37 resting on four feet 39, and a control panel 41. The housing 29 encloses a highly warp-resistant support 43 which is preferably constructed of tubular members. The support 43 may be provided with a portion 45 which is open in an upward and forward direction. The front surface 31 of the portion 45 terminates in a frame 47. The frame 47 is inherently warp-resistant, and on its rear surface facing the interior of the support 43, the frame 47 supports two first guide rails 49 and 51 spaced from each other in super-posed relationship (see FIG. 7). The guide rails 49 and 51 may be commercially available precision roller or ball guides on which there are disposed schematically depicted guide shells 53 including rolling elements. A toothed rack 55 is mounted on an upper brace 57 of the support 43 adjacent and in parallel to the upper rail 51. A drive pinion 58 (FIG. 6) of a first drive 59 (partially shown in FIG. 7) meshingly engages the toothed rack 55. The drive is an electric servomotor. The drive is mounted to the lower surface of a support 61 of a carriage 63 which is movable in a first direction X on the guide rails 49 and 51 by way of the guide shells 53. The guide shells 53 are mounted on support struts 65 which extend vertically downwardly from the support 61. The lower ends 67 of the support struts 65 are connected by inclined braces 69 to the lower surface of supports 73 at the side margins of the support 61. Hence, the carriage 63 is of L-shaped cross-section and provides a space 71 therebelow which is free even during movement of the carriage 63.

Second guide rails 75 and 77 are mounted upon the supports 73. The second guide rails 75 and 77 support and guide a pivot carriage 79 in a second transport direction Y. The pivot carriage 79 supports a pair of pivot bearings 81 to which the cantilever 27 is connected. A second drive 83 for moving the pivot carriage 79 in the second transport direction Y and a third drive 85 for pivoting of the cantilever 27 are shown schematically in FIG. 6. The two drives 83 and 85 are electric servomotors as well.

A heavy steel plate 87 is mounted to the front side 31 of the housing as a heat shield. The lower edge 89 of the plate 87 is spaced from the bottom 91 by a distance b and by a distance c from the upper edge of the lids 33 and 35. Two slots above and below the steel plate 87 affect a natural upward convection of cool air from the bottom region.

Power cables 93 and 95, partially shown in FIG. 4, for the supply of current to the first drive 59 as well as to the second and third drives 83, 85 may be housed below the supports 73 within the space 71. Advantageously, the cable 93 extends across at least one of the struts 69 below the carriage 63, i.e., in a direction parallel to the direction of movement of the carriage 63. The other cable 95 may advantageously extend normal to the first cable 93, i.e., between the struts 69. The drag radii R determinative of a long life are measured to prevent premature and unpredictable wear of the cables 93 and 95. The space 71 which may be accessed without any danger from the rear even during operation of the apparatus is sufficiently large to receive additional equipment which may have to be accessible during operation.

The function of the apparatus for feeding hot articles 3 of glass from the conveyor 13 across the bridge 21 onto the conveyor 23 of the lehr 7 will be explained in detail hereafter.

The hot glass containers 3 continuously moving on the conveyor 13 to between the feed device 15 and the lehr 7 are seized and moved into the lehr 7 by the feed bar 25 the front surface of which is provided with receptacles 97 complementing the shape of the glass containers 3. Seizing is done in a conventional manner by moving the feed bar 25 toward the glass containers 3 in the feed direction Y and, at the same time in the first feed direction X, in synchronism with the velocity of the conveyor 13. During forward movement the feed velocity in the second feed direction Y is adjusted to the velocity of the conveyor 23 of the lehr 7 as soon as the glass containers approach those which are already present on the lehr conveyor 23. The glass containers 3 may be selectively set up in series, as shown in FIG. 2, or offset, as shown in FIG. 3. The offset or echelon arrangement of FIG. 3 may be obtained by correspondingly moving the feed bar 25 in the feed direction Y by half the diameter of the glass containers 3.

As soon as the glass containers 3 have arrived at their terminal position on the lehr conveyor 23, the feed bar 25 will return to its initial position. During this movement, it is not only moved in the X and Y directions but it is also and at the same time pivoted upwardly so as not to touch the glass containers 3 subsequently fed below the cantilever 27. Prior to a new feed cycle the cantilever has to be pivoted downwardly into its operating position.

The movements in the X and Y directions as well as the upward and downward pivoting movements are provided by the drives 59, 83 and 85. Movement in the first direction X is accomplished by sliding the carriage 63 including all drives mounted thereon and the pivot carriage 79 mounted on the carriage 63 for movement in the Y direction. Movement of the feed bar 25 in the second feed direction Y is brought about by the drive 83 sliding the pivot carriage 79 along the two rails 75 and 77 on the carriage 63. The transmission of movement from the drive 83 to the pivot carriage 79 may be similar to that of the carriage 63, i.e., a toothed rack and pinion (neither shown).

Except for the electrical control components, all drives are mounted on the carriage 63. The electrical connections are plug-in ones and may easily be disconnected. The carriage 63 which is connected by the guide shells 53 to the two guide rails 49, 51 of the frame 47 by its front only, may either be removed from the frame 47, or the entire frame 47, including all mechanical components, may be removed.

What is claimed is:

1. An apparatus for feeding hot glass containers being advanced in a first plane by a conveyor in a first direction toward a lehr, comprising:

means for forming a support frame;

means for forming an elongate feed bar aligned substantially parallel to the first direction;

a cantilever for supporting the feed bar;

means for forming a first carriage for supporting the cantilever;

first drive means for reciprocally moving the first carriage substantially parallel to the first direction;

second drive means for reciprocally moving the feed bar in the first plane in a second direction substantially normal to the first direction;

third drive means for moving the feed bar in a third direction intersecting the first plane;

a plurality of first guide means extending substantially parallel to the first direction and mounted on the support frame in a plane disposed substantially normal to the first plane for movably supporting the first carriage means;

means for forming at least one strut extending from the first carriage means and provided with second guide means slidably connected to the first guide means; and means for forming third guide means mounted on the first carriage extending substantially normal to the first direction in the first plane for moveably supporting the cantilever.

2. The apparatus of claim 1, wherein said cantilever is mounted for pivotal movement about an axis substantially parallel to said first feed direction on second carriage means movably retained by said third guide means.

3. The apparatus of claim 1, wherein said first guide means comprises rail means and said second guide means comprises guide shell means retained by said rail means for movement therealong.

4. The apparatus of claim 1, wherein said first drive means comprises toothed rack means mounted on said support frame to extend substantially parallel to said first direction and motor means mounted on said first carriage means and being provided with a rotatably drivable pinion meshing with said toothed rack means.

5. The apparatus of claim 1, wherein said first, second and third drive means are mounted on said first carriage means.

6. The apparatus of claim 1, wherein said first, second and third drive means comprise electric servomotors.

7. The apparatus of claim 1, wherein said strut means is supported by inclined braces connected to a rear section of said first carriage means and wherein said first carriage means is supported by said first guide means in a cantilevered manner.

8. The apparatus of claim 7, wherein first power cable means is provided below and intersecting said strut means and that second power cable means is provided above said first power cable means between said strut means.

9. The apparatus of claim 1, wherein said support frame is enclosed by a housing, said housing comprising, at a section facing said lehr, heat shield means, lower and upper margins of said heat shield means comprising gaps for providing an upward convection of cooling air inside said housing.

10. The apparatus of claim 9, wherein a top section of said housing is provided with lid means to allow access to the interior of said housing.

11. The apparatus of claim 1, wherein means is provided for controlling the operation of said first, second and third drive means.

12. The apparatus of claim 11, wherein said control means is such as to allow changes in the operation of said apparatus during the operation thereof.

13. The apparatus of claim 1, wherein said glass containers are bottles fed in an upright orientation.

14. The apparatus of claim 3, wherein said first carriage means is retained on said first guide means for easy disconnection.

15. The apparatus of claim 2, wherein said second carriage is retained on said first carriage for easy removal therefrom.

* * * * *